Sept. 2, 1952           J. E. BELLAM           2,609,166

AIRPLANE FLAP SUPPORTING AND CONTROL MECHANISM

Filed Dec. 22, 1945           2 SHEETS—SHEET 1

*INVENTOR.*
JOSEPH E. BELLAM
BY Reynolds & Beach
ATTORNEYS

Sept. 2, 1952  J. E. BELLAM  2,609,166
AIRPLANE FLAP SUPPORTING AND CONTROL MECHANISM
Filed Dec. 22, 1945  2 SHEETS—SHEET 2

*INVENTOR.*
JOSEPH E. BELLAM
BY
Reynolds & Beach
ATTORNEYS

Patented Sept. 2, 1952

2,609,166

UNITED STATES PATENT OFFICE 2,609,166

AIRPLANE FLAP SUPPORTING AND CONTROL MECHANISM

Joseph E. Bellam, Seattle, Wash., assignor to Boeing Airplane Company, a corporation of Delaware Application December 22, 1945, Serial No. 636,892

11 Claims. (Cl. 244—42)

Various types of supporting and operating mechanism have been proposed for a flap carried by the trailing edge of an airplane wing, and this invention involves an improved type of supporting and controlling structure for such flaps.

A particular object of the invention is to enable such a flap to be shifted from a retracted position forward of the trailing edge of the wing into a rearwardly extended position in which the leading edge of the flap is disposed substantially at the extreme trailing edge of the wing, yet to support the flap for such movement by mechanism which is very compact, being housed entirely within the contour of the wing when the flap is in its retracted position.

In thus supporting the flap for movement between its two extreme positions it is a further object to employ mechanism of simple construction which, nevertheless, is disposed to effect the most direct connection between the flap and the wing, so that the forces produced by the air loads on the flap can be transmitted to the wing in the most direct manner. At the same time the flap-supporting structure is light in weight.

As a safety measure, it is an object to mount the flap yieldably, if desired, to enable it to move into a position in which the air load on it will be reduced, if the flap should be projected at a time when the airplane is traveling at an excessive speed. Such operation may be permitted without adversely affecting the normal lift-increasing operation of the flap at low speed.

Additional advantages arising from various details of the flap mounting structure will be pointed out in the following specific description of the preferred form of the invention.

Figure 1:
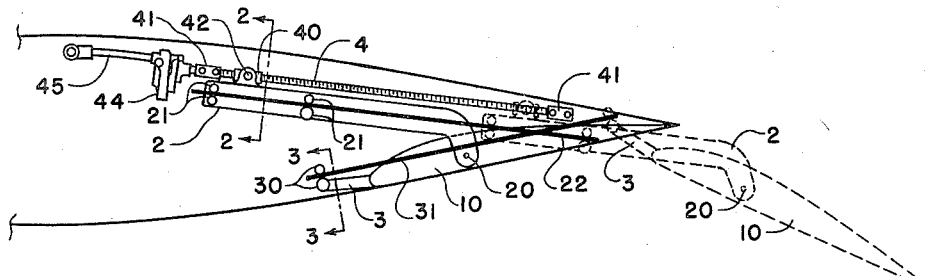
Figure 1 is a diagrammatic chordwise sectional view, illustrating the positions assumed by various parts of the flap-supporting mechanism in the extreme retracted or extreme projected positions of the flap.

As shown in Figure 1, the wing 1 has a recess in the under side of its trailing portion in which the flap 10 is received when in retracted position. The lower surface of the flap then lies in rearward continuation of the lower surface of the wing, so that together the wing and flap define the desired airfoil profile for cruising condition of the airplane. During takeoff and landing, however, the flap is projected rearwardly from its retracted or stored position, and is swung downwardly to increase the airfoil area and the effective camber of the wing and flap combination.

To obtain the greatest increase in lift from the flap in its extended position it should be projected rearwardly a distance sufficient to locate its leading edge substantially at the extreme trailing edge of the wing, preferably directly beneath it. In thus positioning the flap, however, it is essential that its supporting mechanism be located and designed to transmit safely to the wing structure the lift produced by the aerodynamic load on the flap. Such operation is facilitated by placing the flap-supporting structure as close to the extreme trailing edge of the wing as feasible, consistent with elements connected both to the flap and to the wing which are capable of transmitting the flap load safely to the wing.

The portion of the flap-supporting mechanism connected directly to the flap consists of a main arm 2 guided for lengthwise reciprocation, and an auxiliary arm 3 which swings as it is displaced bodily. The forward ends of both of these arms engage tracks mounted on the wing 1, while their rearward ends are secured to the flap 10 at locations spaced chordwise of the flap. The arm 2 transmits to the wing the major portion of the load on the flap, being connected to it in the vicinity of its center of lift by a pivot pin 20. Such connection should be made to a flap spar or other strong structural member of the flap. The arm 3, on the other hand, controls the angle of incidence of the flap, and its rearward end is secured to the flap's leading edge, preferably in a rigid manner. Any desired number of arms 2 and 3 may be distributed spanwise along the flap.

Each arm 2 is supported by rollers 21 which roll along an upper track 22 housed entirely within the profile of the wing and flap combination when the flap is disposed in retracted position. It is mounted on a wing rib or other structural member 11. This track is straight and is arranged generally chordwise of the wing 1, preferably being substantially parallel to the upper surface of the wing, but spaced somewhat below it, as shown in Figure 1, and extends rearwardly substantially to the lower wing skin. In order to locate the flap in its proper position the rearward end of arm 2 is formed with a downward hook of substantial length to carry pivot 20.

Figure 2:
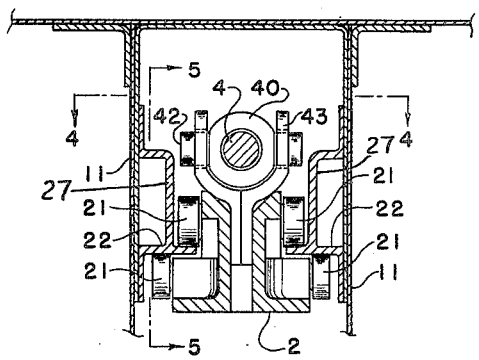
Figure 2 is a fragmentary sectional view of a portion of the flap-supporting mechanism taken along line 2—2 of Figure 1.

To afford greater strength the track 22 is preferably of the divided type, as shown in Figure 2. Moreover the track flange of each track section may be stiffened by the box-shaped reinforcement 27. The rollers 21 are mounted on opposite sides of the arm 2 and engage both the upper and lower sides of each track section so that they prevent twisting, as well as upward and downward tilting of the arm. Moreover, in order to support the rearward portion of the arm in cantilever fashion, at least two sets of rollers, spaced a substantial distance apart lengthwise of the arm, are provided, as shown in Figure 1. These rollers are located so that the arm is in position generally parallel to the track. The arm itself should be formed of a structural shape, for example as a T-bar, as in Figure 2, so that it will not be bent appreciably by the load acting on flap 10.

Since most of the load on the flap is transmitted to the wing structure through the arms 2, the arms 3 may be of comparatively light construction. The forward end of each such arm carries rollers 30 bearing on a lower track 31. These tracks are carried by the wing structure, preferably by the same structural members 11 on which tracks 22 are mounted, in a position generally chordwise of the ring, preferably substantially parallel to, but somewhat above, the lower surface of the wing and flap composite airfoil profile when the flat is in retracted position. The track extends rearwardly substantially to the upper wing skin, as shown in Figure 1. It will be evident, therefore, that over at least the major portions of their lengths the two tracks 22 and 31 are in vertically spaced relationship, and converge rearwardly, as do the airfoil surfaces, and at substantially the same angle, usually about 20 degrees. Both tracks extend rearwardly to approximately the same distance from the extreme trailing edge of the wing, and, in fact, substantially to the wing's trailing edge.

Because each of these tracks is spaced a substantial distance inward from the surface of the airfoil to which it is parallel, and also extends rearwardly substantially to the outer surface of the airfoil in each instance, the tracks are disposed in crossed relationship, as shown in Figure 1. Moreover, it is preferred that both of these tracks be straight for ease of manufacture, although generally the same type of flap movement may be obtained with slightly curved tracks.

If each arm 3 is secured rigidly to the leading edge of flap 10 such arm must be swingable relative to its track to enable the flap to move in a manner to increase its angle of incidence as it is projected rearwardly from the wing. The arm 3 thus forms, in effect, an integral part of the flap, and, in fact, the rollers 30 could actually be mounted directly on the flap's leading edge, except that it is desirable for such leading edge to be spaced slightly below the extreme trailing edge of the wing when the flap is in full projected position, instead of extending somewhat into the flap-receiving recess formed beneath the trailing portion of the wing.

Figure 3:
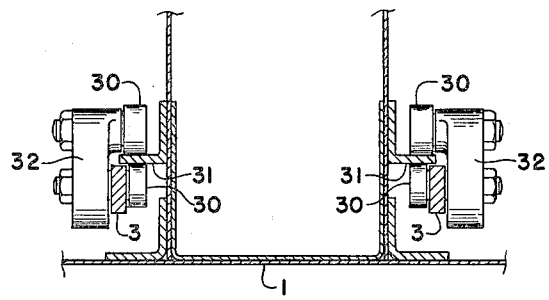
Figure 3 is a similar view of another portion of the flap-supporting mechanism on line 3—3 of Figure 1.

As shown in Figure 3, therefore, the forward end of arm 3 is pivoted to the carriage 32 carrying rollers 30. Preferably track 31 is divided in the same manner as track 22, one section being mounted on the side of each wing element 11 opposite that on which a track section 22 is mounted. Two separate arms 3 may therefore be provided for each main arm 2, as shown in Figure 3, located at opposite sides of the main arm. Because of the pivot connection between each arm 3 and its carriage 32 no bending force can be transmitted from the arms to such carriage, and consequently there would be no advantage in the carriage having more than one set of rollers 30 spaced lengthwise of the track.

It will be appreciated that the mechanism for moving the flap between retracted and extended positions may engage either arms 2, or arms 3, or the flap 10 itself, since all these elements move together as a unit. Moreover any of various types of drive mechanism may be employed, but a convenient form of actuator includes a screw 4 threaded through a nut 40. Theoretically nut 40 could be mounted rigidly upon a movable element, such as arm 2, to shift it, since, as shown in Figure 1, screw 4 is rotatively supported by bearings 41 in a position exactly parallel to track 22, and arm 2 is carried by rollers 21 always in parallel relationship to the track. A pivotal connection between nut 40 and arm 2 is preferred, however, to eliminate any binding between the screw 4 and nut 40 which might be caused by a slight misalignment of the nut and arm occasioned either by inaccuracies in manufacture of the parts or by wear during use. The nut 40 therefore has trunnions 42 received in journal apertures of yoke 43 carried by arm 2. Such apertures may even be elongated slightly perpendicular to tracks 22 to allow further adjustment, but should fit the journals snugly parallel to the tracks to hold the flap firmly.

Bearings 41 restrain endwise movement of screw 4, but it may be rotated to reciprocate nut 40 lengthwise of it by suitable drive mechanism, which may include the gear box 44 and the flexible drive shaft 45. Such shaft may be rotated either manually or by an electric motor. If the shaft is rotated by a motor suitable limit switches, engageable by the nut 40 or arm 2, may be arranged in the path of movement of these parts and connected in the circuit of the motor to deenergize it automatically at opposite ends of the nut travel. The screw should be of such a length that in the extreme projected position of the flap the rearward set of rollers 21 will be moved substantially to the rearward end of tracks 22, and arms 3 should be of such a length that the rollers 30 of carrage 32 will also be moved substantially to the rearward end of track 31, to locate the leading edge of the flap at least as far aft as the rearward ends of tracks 22 and 31.

With the parts in the retracted position shown in Figure 1 of the drawings it will be noted that no part of the flap-supporting mechanism interrupts or projects beyond the smooth profile of the composite wing and flap airfoil. As the screw 4 is rotated to drive nut 40 to the right in Figure 1, the arm 2 will be projected rearwardly toward its broken line position, and will carry with it the flap 10. During this movement pivot 20 will be moved downward somewhat, and each arm 3, moving with the flap, will draw its carriage 32 along track 31. Since this track slopes rearwardly and upwardly the forward end of arm 3 will be raised as pivot 20 is lowered, tilting such arm and the flap progressively throughout such movement to increase the flap's angle of incidence. While the total angular displacement of the flap between its solid line and broken line positions of Figure 1 may be 35 or 40 degrees, the flap will be operative to supplement the wing lift to a lesser degree in all intermediate positions, depending upon the degree of its projection.

The angle of incidence which the flap will assume in its fully extended position may be increased either by increasing the downward and rearward inclination of tracks 22, by increasing the upward and rearward inclination of tracks 31, or by moving closer to the leading edge the pivot 20 interconnecting the flap and arm 2. Such change in pivot location will require that the length of the hooked end of such arm be increased and the length of that portion of such arm parallel to track 22 be decreased correspondingly. It is preferred not to alter the inclination of tracks 22 and 31 appreciably, because, while still allowing adequate space for the drive mechanism 4 and nut 40, any increase in the downward and rearward slope of tracks 22, or in the upward and rearward slope of tracks 31, would require that they be shortened, if they are to remain within the composite airfoil contour. Consequently it would be necessary to lengthen arms 2 and 3 in order to project the flap as far rearward, requiring that they be strengthened, and thus adding to the weight of the flap supporting mechanism.

Figure 4:
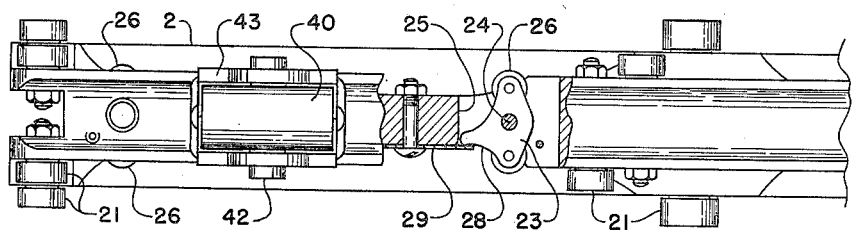
Figure 4 is a fragmentary plan view of a portion of the flap-supporting mechanism taken on line 4—4 of Figure 2, parts being broken away.
Figure 5:
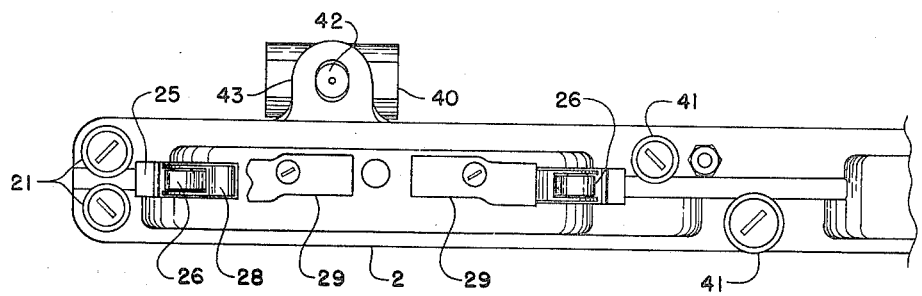
Figure 5 is a side elevational view of the same portion of the flap-supporting mechanism along line 5—5 of Figure 2, parts being broken away.

It is desirable to stabilize arms 2 against lateral movement generally in the plane of the wing 1, as well as upward and downward tilting. For this purpose, as shown in Figure 4, a locator 23 may be received in each of two slots 25 extending transversely through the arm 2 and spaced apart lengthwise of it. Each locator is swiveled on a pivot pin 24, passing through its central portion, and opposite ends of the locator carry rollers 26 engageable with the edges of tracks 22. A lug 28 projecting from one side of the locator is engaged by a spring plate 29, tending to swing the locator into a position transversely of arm 2 to press the rollers against the track edges. In such position of the locator a line joining the axis of such rollers will be very nearly perpendicular to the tracks. Despite slight variation in the spacing between the track edges, therefore, rollers 26 will be held continually in engagement with them by such spring to steady arm 2 against swinging spanwise of the flap 10.

In some instances the flap 10 may be projected rearwardly from its retracted position while the airplane is traveling at a speed considerably higher than its stalling speed. In such event the aerodynamic reaction on the flap, if tilted downwardly to the angle of incidence shown in broken lines in Figure 1, might be greater than the load which the flap supporting structure was designed to carry, so that the flap would be torn off. In order to prevent the imposition of excessive loads on the flap supporting structure under such circumstances the modified construction shown in Figure 6 may be employed.

In this construction the arms 2 and 3 and their respective tracks 22 and 31 are of the same construction, and are disposed in the same manner, as described above in connection with the form of the invention shown in Figure 1. Moreover the supporting and driving mechanism for arm 2, including the screw 4 and the components associated with it, are the same. The difference of this construction resides in the omission of the upper rollers 30 from the carriages 32 shown in Figure 3, and the guiding action of the track 31.

Instead of positively restraining the forward end of arm 3 to movement along track 31, engagement of the lower rollers 30 of arm 3 with such track is effected only by the resilience of spring 5. This spring is carried by arm 2 below and in substantially parallel relationship to it. The forward end of the spring is attached directly to bracket 50 projecting downward from such arm, and the rearward end of the spring is connected to a line 51. This line extends rearwardly, first around a pulley 52 carried by a second bracket 53 extending downwardly from arm 2 and spaced from bracket 50 a distance substantially greater than the length of spring 5, and then upward around a second pulley 54 mounted directly on the arm. The rearward end of this line is secured to the leading edge of the flap 10 at a point substantially directly beneath pulley 54.

With the parts in the solid line positions shown in Figure 6 the leading edge of flap 10 is disposed a substantial distance below pulley 54, and consequently line 51 is tensioned to stretch spring 5. The resilience of the spring thus draws upward the leading edge of the flap to hold the lower roller 30 in firm engagement with the under side of track 31 when the flap is in retracted position. As screw 4 moves arm 2 rearwardly to project flap 10, the distance between pulley 54 and the anchor point of line 51 on the leading edge of flap 10 decreases despite the swinging of flap 10, because of the convergence of tracks 22 and 31.

Figure 6:
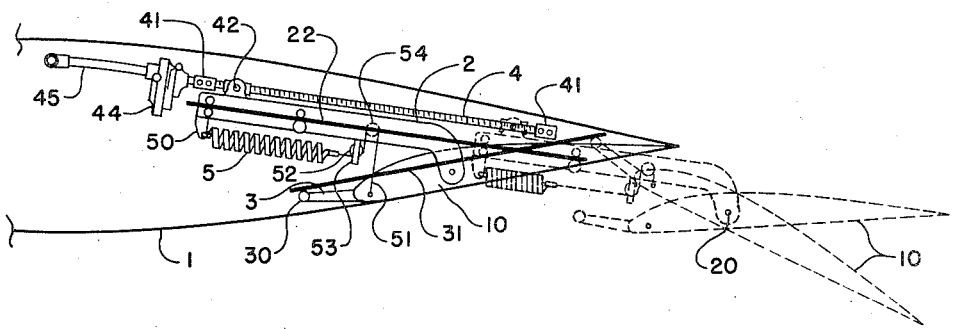
Figure 6 is a diagrammatic sectional view taken chordwise of the airplane wing showing a modified type of flap-supporting mechanism in the extreme retracted and extreme projected positions of the flap.

Spring 5 can relax in proportion to the decrease in stretch between pulley 54 and the flap until, when the flap has reached the broken line position of Figure 6 in which roller 30 is in engagement with track 31 and the flap is tilted to its preferred angle of incidence corresponding to that assumed by the flap in the device shown in Figure 1 when in extended position, the anchor point of line 51 will be quite close to pulley 54. If the air load on the flap is excessive, however, its angle of incidence will be decreased because the pressure on the portion of the flap rearward of pivot 20 will be greater than that on the portion of smaller area forward of such pivot.

As the flap is thus tilted to swing its leading edge downward, line 51 will be drawn downward to stretch spring 5 until the resilience of the spring thus tensioned balances the differential in air loading on the portions of flap 10 ahead of and behind pivot 20. As the speed of the airplane decreases and the air loading differential on the flap is reduced correspondingly, the spring will draw the leading edge of the flap upward, tending to dispose the flap at its greatest angle of incidence. Because of the increase in stretch of the spring as the flap is retracted a progressively greater difference in air load will be required to decrease the flap's angle of incidence by displacement of roller 30 from track 31, and the aerodynamic reaction on the flap for a given airplane speed is progressively less because the angle of incidence decreases continuously as the flap is retracted.

I claim as my invention:

1. Supporting mechanism for an airplane wing flap, comprising two wing structural members extending chordwise of the wing and disposed in closely spaced relationship spanwise of the wing, two upper track members mounted on the side of each of said wing structural members facing the other such structural member, in parallel relationship, two lower track members mounted on the side of each of said two wing structural members away from the other such structural member, in parallel relationship, an upper arm having its rearward end secured to the flap, means engaging both of said upper track members, guided for movement therealong, and supporting the forward end of said upper arm, two lower arms disposed on opposite sides of said upper arm and having their rearward ends connected to said flap, and means secured to the forward end of each of said lower arms and engageable, respectively, with said lower track members for movement therealong.

2. Control and supporting mechanism for an airplane wing flap located beneath the trailing portion of the wing in retracted position, comprising an upper track mounted on the wing in a downwardly and rearwardly inclined position, a lower track mounted on the wing in an upwardly and rearwardly inclined position, means movable along said upper track and connected to said flap, guide means supported from the flap and engageable with said lower track for limiting upward swinging of the flap's leading edge, and resilient means normally operable to maintain said guide means in engagement with said lower track, but yieldable for displacement of said guide means downward away from said lower track upon the occurrence of an excessive air load on the flap to enable its angle of incidence to be reduced.

3. Control and supporting mechanism for an airplane wing flap located beneath the trailing portion of the wing in retracted position, comprising an upper track housed within the trailing portion of the wing and mounted thereon in a position substantially parallel to the upper wing surface but spaced downwardly therefrom, a lower track housed within the trailing portion of the wing and mounted thereon in a position substantially parallel to the lower surface of the flap in retracted position but spaced upward therefrom, an upper arm guided by said upper track for reciprocation parallel thereto, pivot means interconnecting said upper arm and said flap for relative swinging movement, a lower arm having its rearward end secured rigidly to the forward end of said flap and extending forwardly therefrom, guide means carried by the forward end of said lower arm and engageable with said lower track for limiting swinging of the flap about said pivot means in a direction to increase its angle of incidence, spring means supported from said upper arm, and means connected to said spring means and to the flap, for stressing said spring means upon downward movement of the flap's leading edge, to enable said guide means to be displaced downward away from said lower track and the angle of incidence of the flap to be reduced upon the occurrence of excessive air load on the flap, said spring means acting to draw the leading edge of the flap upward again for reengagement of said guide means with said lower track upon sufficient decrease in the air load on the flap.

4. Control and supporting mechanism for an airplane wing flap located beneath the trailing portion of the wing in retracted position, comprising an upper track housed within the trailing portion of the wing and mounted thereon in a position substantially parallel to the upper wing surface but spaced downwardly therefrom, a lower track housed within the trailing portion of the wing and mounted thereon in a position substantially parallel to the lower surface of the flap in retracted position but spaced upward therefrom, an upper arm guided by said upper track for reciprocation parallel thereto, pivot means interconnecting said upper arm and said flap for relative swinging movement, a lower arm having its rearward end secured rigidly to the forward end of said flap and extending forwardly therefrom, guide means carried by the forward end of said lower arm and engageable with said lower track for limiting swinging of the flap about said pivot means in a direction to increase its angle of incidence, a spring disposed substantially parallel to said upper arm, anchor means carried by said upper arm and connected to one end of said spring, and a line connected to the other end of said spring and to the leading edge of the flap, for stretching said spring upon downward movement of the flap's leading edge, to enable said guide means to be displaced downward away from said lower track and the angle of incidence of the flap to be reduced upon the occurrence of excessive air load on the flap, said spring acting to draw the leading edge of the flap upward again for reengagement of said guide means with said lower track upon sufficient decrease in the air load on the flap.

5. In an airplane, a wing flap, a wing having a recess in the underside of its trailing portion adapted to receive said wing flap in retracted position to form therewith a composite airfoil, an upper straight track housed within the contour of the trailing portion of such composite airfoil, mounted on said wing in a position extending downwardly and rearwardly substantially parallel to the upper surface thereof but spaced a substantial distance downwardly therefrom, and extending rearwardly substantially to the under surface of such composite airfoil adjacent to the wing's trailing edge, a lower straight track housed within the contour of the trailing portion of such composite airfoil, mounted on said wing in a position extending upwardly and rearwardly substantially parallel to the under surface of such composite airfoil, but spaced upwardly from it, and extending rearwardly substantially to the upper wing surface adjacent to the wing's trailing edge, said upper and lower tracks thereby being disposed in crossed relationship, means guided by said upper and lower tracks for movement therealong chordwise of the wing substantially to the rearward ends of said tracks, and supporting said wing flap for movement between its retracted position and a rearwardly extended position in which the leading edge of said flap is substantially directly beneath the trailing edge of said wing, and spring means connected at one end to a point on the one of said guided means guided by said upper track and at its other end to said flap at a point near its leading edge, and means operable to translate the force of said spring means into an upwardly directed pull exerted directly on the leading portion of said flap opposing air loads on the flap tending to decrease its angle of incidence.

6. Control and supporting mechanism for an airplane wing flap located beneath the trailing portion of the wing in the retracted position of the flap, comprising an upper substantially straight track mounted on the wing in a position substantially parallel to the upper wing surface, a flap-supporting arm, means guiding the forward end portion of said arm from said upper track for reciprocation parallel thereto while maintaining said arm in substantially constant angular relation to said upper track, pivot means interconnecting the rearward end portion of said arm and said flap for tilting of said flap on said arm, and means for controlling the angle of tilt of the flap carried by said flap-supporting arm during reciprocation thereof, comprising a lower substantially straight track mounted on the wing in a position substantially parallel to the lower surface of the wing, hence convergent rearwardly with said upper track, a lever arm fixedly connected to said flap and projecting forwardly from its forward edge, and pivotal guide means guiding the forward end of said lever arm from said lower track for reciprocation thereof along said lower track while permitting pivoting of said lever arm in relation thereto, rearward movement of said flap-supporting and lever arms causing said flap to travel from its retracted position to an extended position while tilting it downwardly as a result of the convergence of the upper and lower tracks producing relative swinging of the two arms.

7. The control and supporting mechanism defined in claim 6 wherein the rearward end portion of the flap-supporting arm pivotally connected to the flap is down-turned to locate the pivotal flap connection in a line of reciprocation substantially below while parallel to the upper track, which line, extended, intersects the line of reciprocation of the forward end of the lever arm at a location generally intermediate between the forward and rearward positions of travel of the forward end of such lever arm in retraction and extension of the flap.

8. Control and supporting mechanism for an airplane wing flap located beneath the trailing portion of the wing in the retracted position of the flap, comprising flap-projecting means supported from the wing and connected to the flap, supporting such flap pivotally and guiding it for bodily translation from its retracted position into a position projecting rearwardly beyond the trailing edge of the wing, positive drive means for actuating said flap-projecting means to project the flap into said projected position and maintain it there, and flap-tilt control means supported from the wing and connected to the flap to guide it for tilting from its angular position when retracted to an increased angle of incidence when projected, said flap-tilt control means being normally operable to maintain the flap at such increased angle of incidence, but including means yieldable automatically in response to the occurrence of excessive air loads on the flap to enable its angle of incidence to be reduced by tilting of the flap on its supporting pivot.

9. Control and supporting mechanism defined in claim 8 wherein the flap is connected pivotally to the flap-projecting means for support substantially in the vicinity of its center of lift, and the yieldable means includes a spring.

10. Control and supporting mechanism for an airplane wing flap located beneath the trailing portion of the wing in retracted position of the flap, comprising flap-supporting and locating means supporting said flap pivotally at a location in the vicinity of its center of lift and guiding it for movement along a path which is substantially straight and parallel to the upper wing surface, between its retracted position and an extended position located rearward of the wing, and flap-tilt control means comprising a substantially straight guide member disposed substantially parallel to the lower wing surface, a flap-tilting arm rigidly connected to the flap and projecting forwardly from the leading edge thereof, and guided means movable along said guide member and pivotally secured to the forward end of said flap-tilting arm for movement of the arm along said guide member to control tilting of the flap as it moves between retracted and extended positions thereof.

11. Control and supporting mechanism for an airplane wing flap located beneath the trailing portion of the wing in retracted position of the flap, comprising means supporting the flap from the wing for bodily extension and retraction movement of such flap rearwardly and forwardly, respectively, along a path generally parallel to the wing, the flap being pivotally connected to said supporting means to permit tilting of such flap during such movement, and flap-tilt control means comprising a substantially straight guide member disposed substantially parallel to the lower wing surface, a flap-tilting arm rigidly connected to the flap and projecting forwardly from the leading edge thereof, and guided means movable along said guide member and pivotally secured to the forward end of said flap-tilting arm for movement of the arm along said guide member to effect tilting of the flap downwardly during extension movement thereof, and upwardly during retraction movement thereof.

JOSEPH E. BELLAM.

REFERENCES CITED

The following references are of record in the file of this patent:

UNITED STATES PATENTS

| Number | Name | Date |
|---|---|---|
| 1,837,186 | Alfaro | Dec. 22, 1931 |
| 2,202,430 | Rebeski | May 28, 1940 |
| 2,348,150 | Richter | May 2, 1944 |
| 2,352,074 | Brown et al. | June 20, 1944 |
| 2,426,785 | Naumann | Sept. 2, 1947 |

FOREIGN PATENTS

| Number | Country | Date |
|---|---|---|
| 690,381 | Germany | Apr. 24, 1940 |